US 011871864B2

(12) United States Patent
Shin et al.

(10) Patent No.: US 11,871,864 B2
(45) Date of Patent: Jan. 16, 2024

(54) COMPRESSION TYPE RAMEN COOKER USING INDUCTION HEATER

(71) Applicants: Seung Hun Shin, Gyeonggi-do (KR); Se Yeol Choi, Gyeonggi-do (KR); Young Jin Lee, Seoul (KR)

(72) Inventors: Seung Hun Shin, Gyeonggi-do (KR); Se Yeol Choi, Gyeonggi-do (KR); Young Jin Lee, Seoul (KR)

(*) Notice: Subject to any disclaimer, the term of this patent is extended or adjusted under 35 U.S.C. 154(b) by 0 days.

(21) Appl. No.: 17/927,207

(22) PCT Filed: Sep. 4, 2020

(86) PCT No.: PCT/KR2020/011910
§ 371 (c)(1),
(2) Date: Nov. 22, 2022

(87) PCT Pub. No.: WO2021/241806
PCT Pub. Date: Dec. 2, 2021

(65) Prior Publication Data
US 2023/0137572 A1 May 4, 2023

(30) Foreign Application Priority Data
May 27, 2020 (KR) .................. 10-2020-0063512

(51) Int. Cl.
*A47J 27/086* (2006.01)
*A47J 27/08* (2006.01)
(Continued)

(52) U.S. Cl.
CPC ......... *A47J 27/086* (2013.01); *A47J 27/0802* (2013.01); *A47J 27/10* (2013.01); *H05B 6/12* (2013.01)

(58) Field of Classification Search
None
See application file for complete search history.

(56) References Cited

U.S. PATENT DOCUMENTS

2017/0354287 A1* 12/2017 Chang ................ H05B 6/12

FOREIGN PATENT DOCUMENTS

| JP | H 06-304067 A | 11/1994 |
| KR | 10-1683085 B1 | 12/2016 |

(Continued)

OTHER PUBLICATIONS

Translated Abstract of KR-2019037809-A (Year: 2019).*
(Continued)

*Primary Examiner* — Nathaniel E Wiehe
*Assistant Examiner* — Elizabeth M Kerr
(74) *Attorney, Agent, or Firm* — The PL Law Group, PLLC

(57) ABSTRACT

A compression type ramen cooker according to an embodiment includes a main frame including side plates formed on both sides thereof, an upper main bar connecting the upper portions of the side plates, and a lower main bar connecting the lower portions of the side plates, a cooking vessel part rotatably mounted on the inner sides of the side plates, a compression chamber mounted above the upper main bar to seal or open the cooking vessel part by moving up and down, an induction heater rotatably mounted on the rear side of the cooking vessel part to heat the cooking vessel part, a ramen discharging part for discharging cooked ramen from the cooking vessel part, and a drain mounted in the lower end of the side plates on both sides to discard the water used for cleaning the cooking vessel part after cooking.

5 Claims, 18 Drawing Sheets

(51) Int. Cl.
     *A47J 27/10*         (2006.01)
     *H05B 6/12*          (2006.01)

(56) References Cited

FOREIGN PATENT DOCUMENTS

| KR | 10-2017-0132648 | A |  | 12/2017 |  |  |
|----|----|----|----|----|----|----|
| KR | 10-2019-0037813 | A |  | 4/2019 |  |  |
| KR | 2019037809 | A | * | 4/2019 | ............. | A47J 27/14 |
| KR | 2019037811 | A | * | 4/2019 | ............. | A47J 27/14 |
| KR | 2019037813 | A | * | 4/2019 | ............. | A47J 27/14 |
| KR | 10-2019-0127182 | A |  | 11/2019 |  |  |
| KR | 102106929 | B1 | * | 5/2020 | ............. | A47J 27/14 |

OTHER PUBLICATIONS

Translated Abstract of KR-2019037811-A (Year: 2019).*
Translated Abstract of KR-2019037813-A (Year: 2019).*
Translation of KR-102106929-B1 (Year: 2020).*
International Search Report for PCT/KR2020/011910 dated Feb. 3, 2021.
Notice of Allowance dated Oct. 13, 2020 from Korean Patent Office in a counterpart Korean Patent Application No. 10-2020-0063512 (English translation is also submitted herewith.).

* cited by examiner

COMPRESSION TYPE RAMEN COOKER USING INDUCTION HEATER

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/011910, filed Sep. 4, 2020, which claims priority to the benefit of Korean Patent Application No. 10-2020-0063512 filed in the Korean Intellectual Property Office on May 27, 2020, the entire contents of which are incorporated herein by reference.

BACKGROUND

1. Technical Field

The present invention relates to a compression type ramen cooker using induction heater, and more particularly, to a compression ramen cooker using an induction heater, in which ramen can be cooked rapidly by heating the induction heater in a compressed state.

2. Background Art

As the modern life shifts to a five-day work per a week, people's leisure activities are gradually increasing. As leisure activities gradually increase, each local government is providing a variety of resting spaces in outdoor parks, playgrounds, or terrace lands on the river. Accordingly, people are gradually increasing their outdoor activities in family units or club units.

In addition, lunchboxes are accompanied by various outdoor activities, but since it is inconvenient to prepare a lunchbox, they usually prefer ramen that can be quickly cooked and eaten at convenience stores as a simple snack or meal replacement.

If you eat ramen, you buy cup noodles at a convenience store, etc., put water heated at a high temperature into a cup noodles container, and eat ramen after a certain period of time. Cup noodles are not good for the human body because they use a polymer container. Accordingly, an instant ramen cooker that can replace cup noodles was released, and the instant ramen cooker puts ramen and water in an aluminum foil case and boils it. However, the conventional instant noodle cooker uses a coil-shaped heater as a heating mechanism. When using the coiled-shaped heater, since the printed circuit board for operating the heater is installed close to the heating device, when water overflows during cooking, there are problems that water which is overflowed during cooking can enter the inside of the heater device, and accordingly, the water in the heating device causes the wiring or the board of the heating device to be disconnected or damaged due to a short circuit.

In addition, there is a problem in the conventional ramen cooker that since the water storage tank and electrical parts are not perfectly isolated and water vapor is always generated in the water storage tank, steam spreads inside the ramen cooker and all electrical parts are corroded or short circuited.

In addition, there is a problem in the conventional ramen cooker that it takes a lot of time because the cooker uses a heating coil and boils water under normal atmospheric pressure to cook the ramen.

In order to solve these problems, a compression type ramen cooker has been released, but the problem of the compression type ramen cooker is that a separate compression container is required for compression and it is not easy to handle the compressed container. In addition, there has been released that a compression type ramen cooker embodies a compressed container, but there is a problem that the compression type ramen cooker has a heater integrally formed at the bottom of the compressed container.

SUMMARY

The present invention has been devised to solve the above problems, and an object of the present invention is to provide a ramen cooker using an induction heater provided with an induction heater separately from a compression container.

Another object of the present invention is to provide a ramen cooker using an induction heater capable of washing the ramen cooker after the ramen is cooked because the heater is separated from the ramen cooker.

Another object of the present invention is to provide a ramen cooker using induction, which can shorten the ramen cooking time and provide convenience for ramen cooking by separately forming a ramen cooking container and a compression lid.

In order to achieve the above object, the present invention provides a main frame including side plates formed on both sides, an upper main bar connecting the upper portions of the side plates, and a lower main bar connecting the lower portions of the side plates; a cooking container rotatably mounted on the inner side of the side plate; a compression chamber mounted on the upper part of the upper main bar to close or open the cooking container while moving up and down; an induction heater rotatably mounted on the rear side of the cooking container to heat the cooking container; a ramen discharging part for discharging the cooked ramen from the cooking container; and a drain installed at the lower end of the side plates on both sides to discard the water washed away from the cooking container after cooking.

In the present invention, the cooking container includes: a cooking container into which ramen and soup are put; a container fixture to which the cooking container is inserted and fixed; a rotating shaft that is fixedly mounted on both sides of the container fixture; a rotating link mounted on the rotating shaft to move the ramen discharging part forward and backward while rotating together; a motor unit for rotating the rotating shaft from one side of the rotating shaft; and a sensor unit for controlling the rotation angle of the motor at the other side of the rotation shaft.

In the present invention, the compression chamber includes: a support frame including a lower support plate mounted on the upper main bar, a support bar mounted on a corner of the lower support plate, and an upper support plate mounted on the upper portion of the support bar; a chamber container unit including a lid and a container body to which the lid is fixed and the bottom surface is coupled to the cooking container to seal the cooking container; a vertical driving unit connected to both upper sides of the chamber container unit and mounted on the upper support plate to move the chamber container unit up and down; and fastening hooks mounted on both lower sides of the chamber container unit and coupled to the container fixture of the cooking container according to the rotation of the induction heater.

In the present invention, the induction heater includes: an induction heater in contact with the lower portion of the cooking container; a support link fixedly supporting the induction heater at one side and connected to the rotating shaft at the other side; a rotating shaft to which the other side of the support link is fixed; a rotation guide fixed to the rotating shaft and rotating together with the rotating shaft to guide the forward and backward movement of the fastening hook and to mount or detach the fastening hook to the container fixture; a motor unit for rotating the rotating shaft; and a sensor unit for controlling the rotation angle of the motor unit.

In the present invention, the ramen discharging part includes: a discharge frame including a base plate, and a side base plate extending upward from both sides of the base plate and having a guide plate with a guide groove formed on an outer surface; a container discharge unit mounted on an upper portion of the base plate; a discharge guide mounted on the underside of the base plate; and a guide bar mounted on the main bar to guide the forward and backward movement of the discharge guide, wherein the ramen discharging part moves forward and backward as the link pin of the rotating link moves up and down in a predetermined track of the guide groove.

According to the compression type ramen cooker using induction heater of the present invention, there is an advantage that it can be safely cooked because it uses the induction heater.

In addition, according to the compression type ramen cooker using induction heater of the present invention, there is the advantage that the noodles can feel chewy after cooking since compression chamber capable of compressing the cooking container.

In addition, according to the compression type ramen cooker using induction heater of the present invention, there is the advantage that it can be washed after cooking.

In addition, according to the compression type ramen cooker using induction heater of the present invention, there is the advantage that it can be used as a ramen vending machine because the ramen discharge container is automatically supplied after the ramen is cooked.

DETAILED DESCRIPTION

The best modes of embodiments of the present invention includes: a main frame including side plates formed on both sides, an upper main bar connecting the upper portions of the side plates, and a lower main bar connecting the lower portions of the side plates; a cooking container rotatably mounted on the inner side of the side plate; a compression chamber mounted on the upper part of the upper main bar to close or open the cooking container while moving up and down; an induction heater rotatably mounted on the rear side of the cooking container to heat the cooking container; a ramen discharging part for discharging the cooked ramen from the cooking container; and a drain installed at the lower end of the side plates on both sides to discard the water washed away from the cooking container after cooking.

Hereinafter, preferred embodiments of the present invention will be described in detail with reference to the accompanying drawings. However, this is intended to describe in detail enough that a person of ordinary skill in the art to which the present invention pertains can easily implement the invention, and this does not mean that the technical spirit and scope of the present invention are limited thereto.

Figure 1:
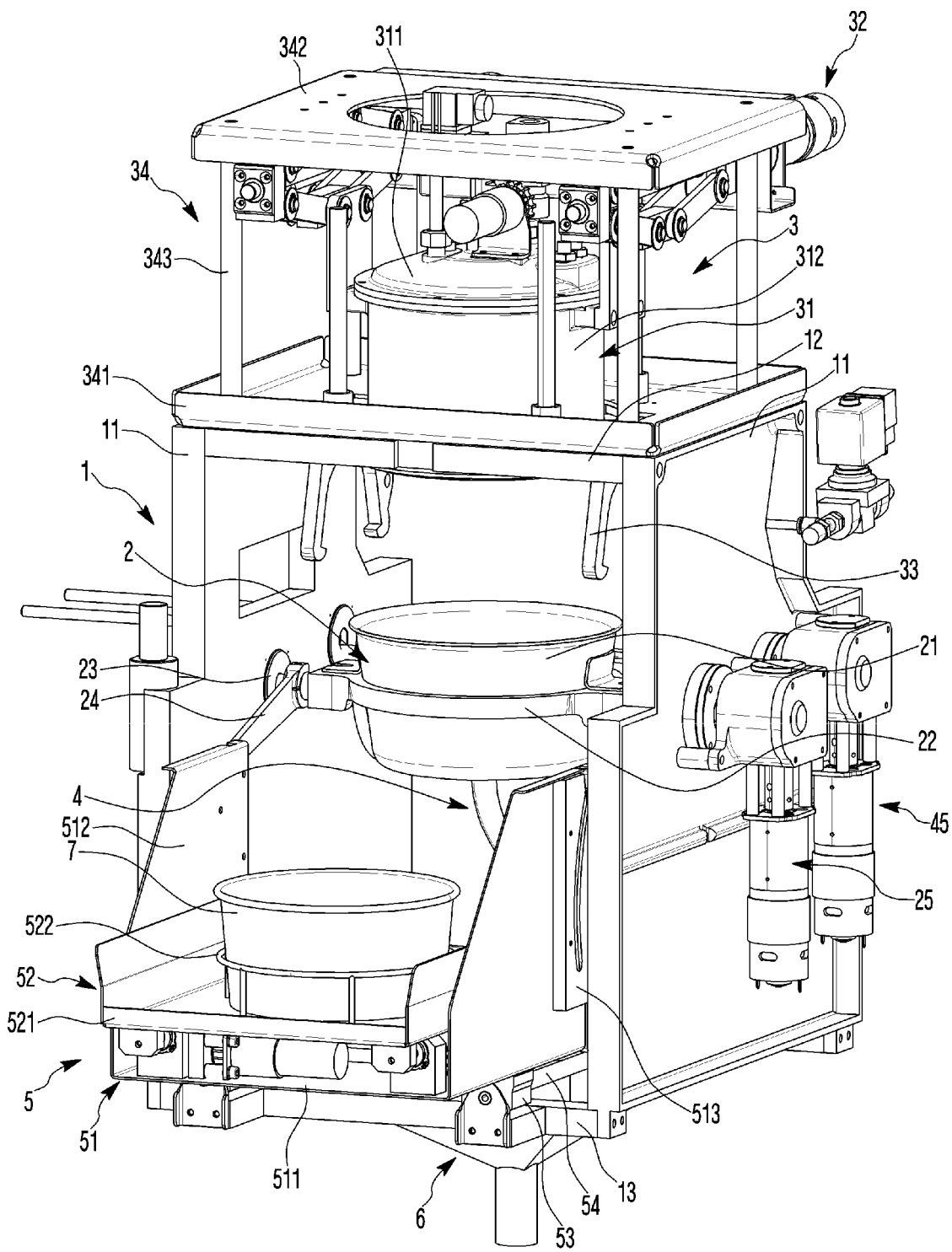
FIG. 1 is a perspective view of the compression type ramen cooker using induction heater according to the present invention.
Figure 2:
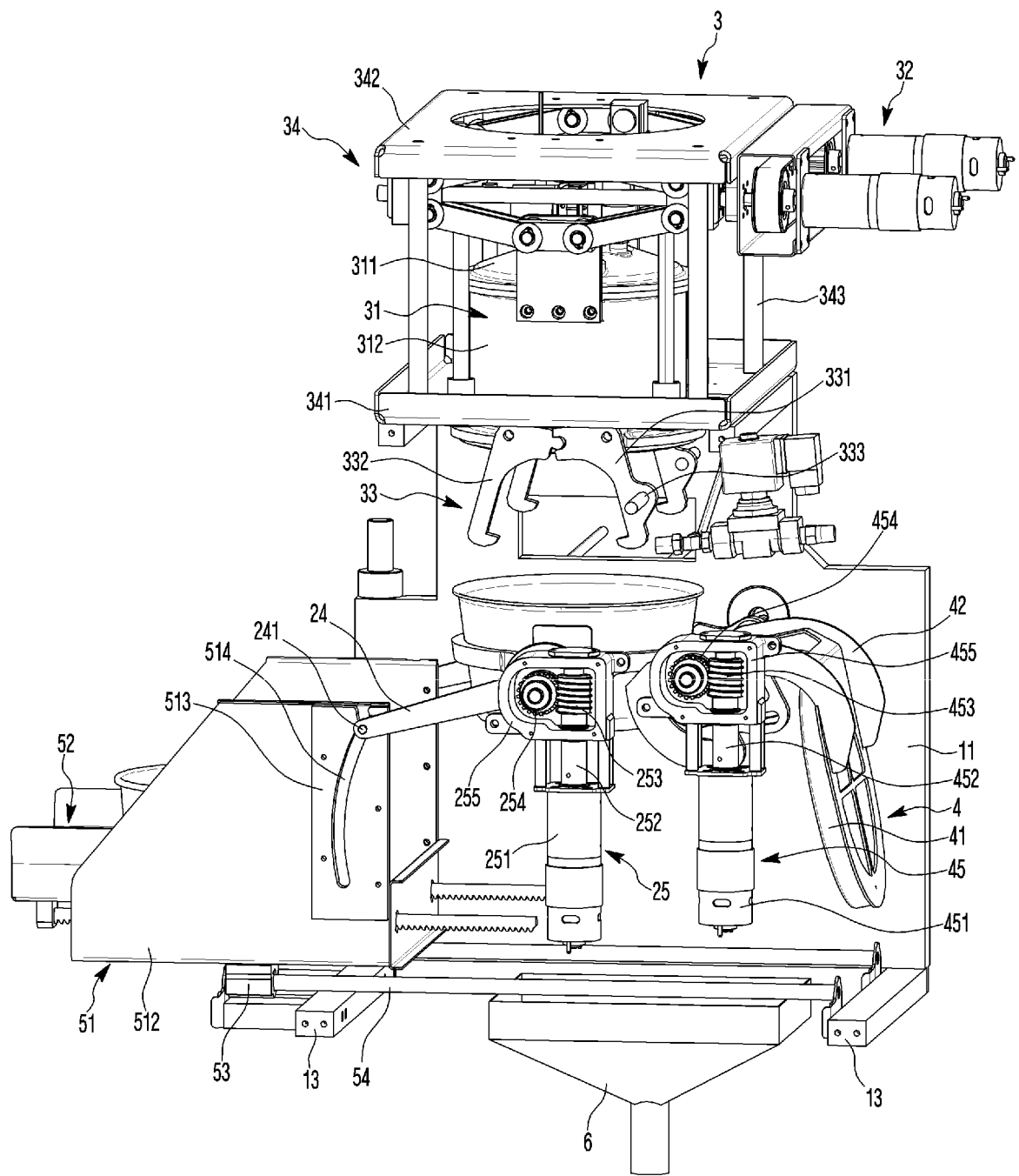
FIG. 2 is a perspective view of a state in which the side plate of one side is removed from the compression type ramen cooker using induction heater according to the present invention.
Figure 3:
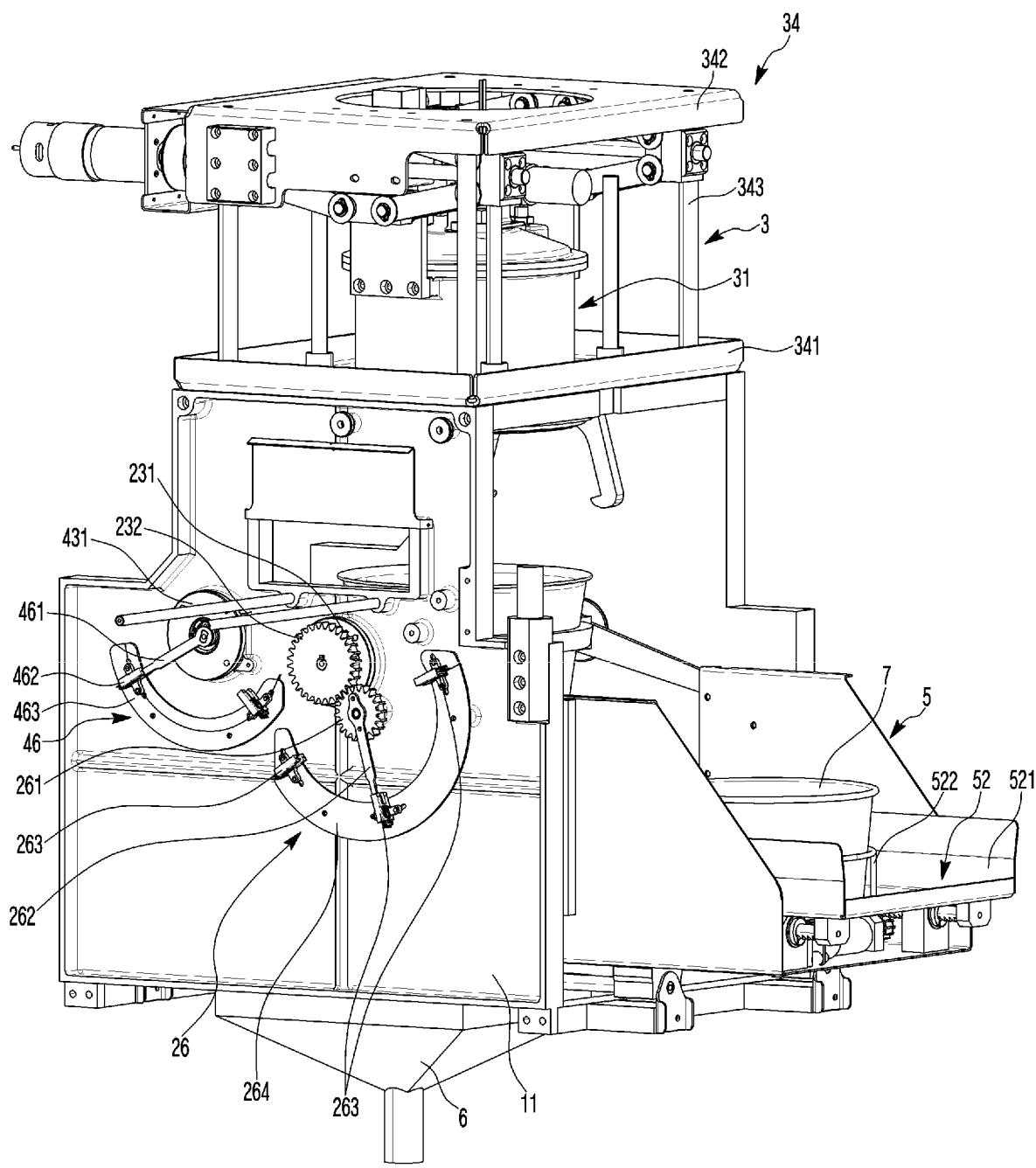
FIG. 3 is a side perspective view of the compression type ramen cooker using induction heater according to the present invention.
Figure 4:
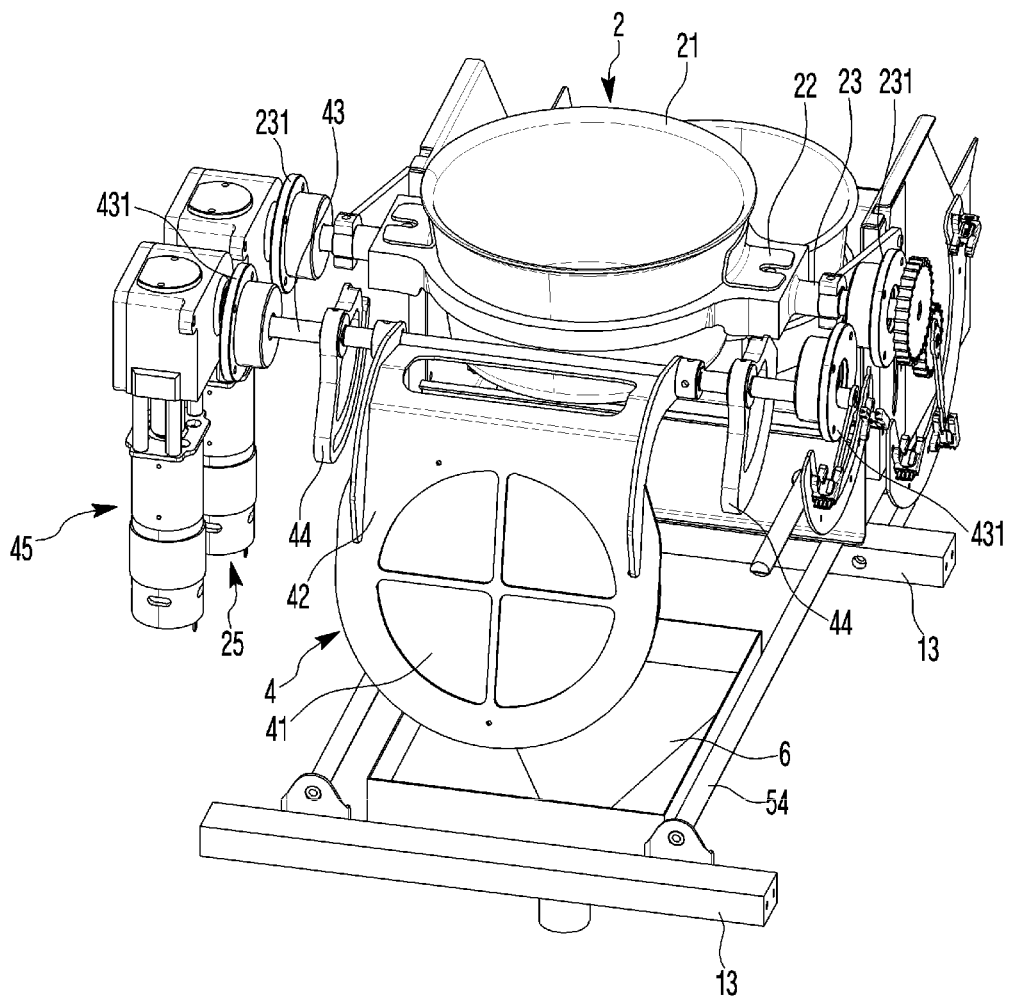
FIG. 4 is a perspective view of a cooking container and an induction heater of the compression type ramen cooker using induction heater according to the present invention.
Figure 5:
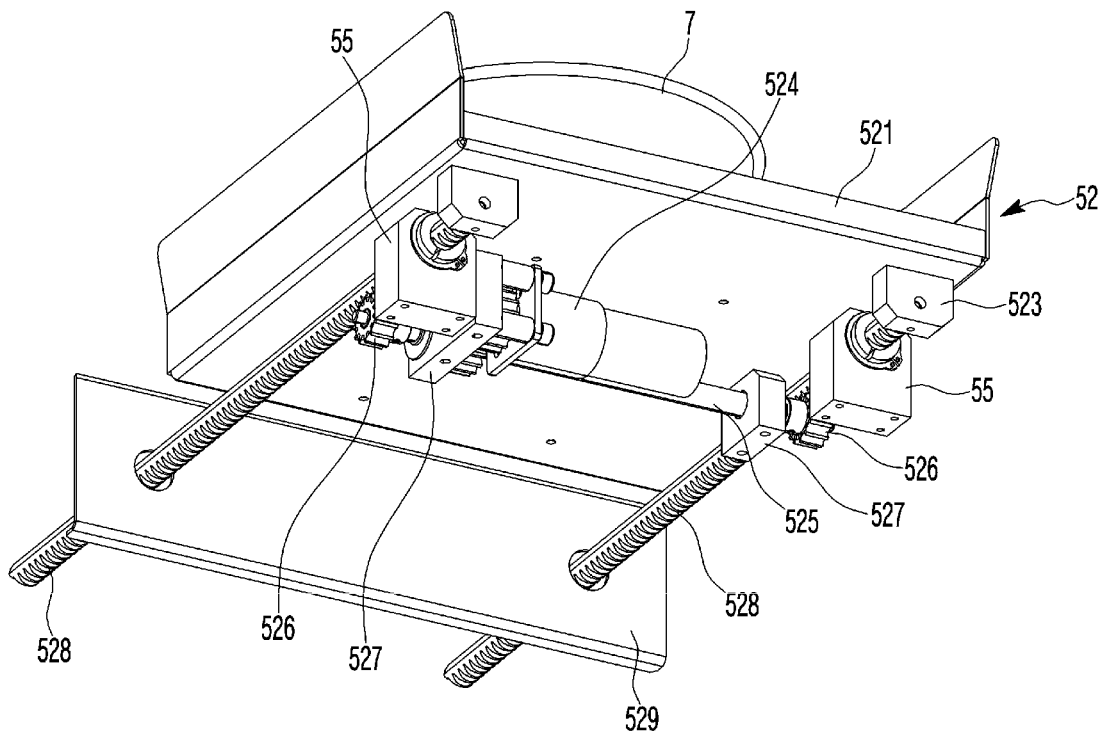
FIG. 5 is a perspective view of a ramen discharging part of the compression type ramen cooker using induction heater according to the present invention.
Figure 6:
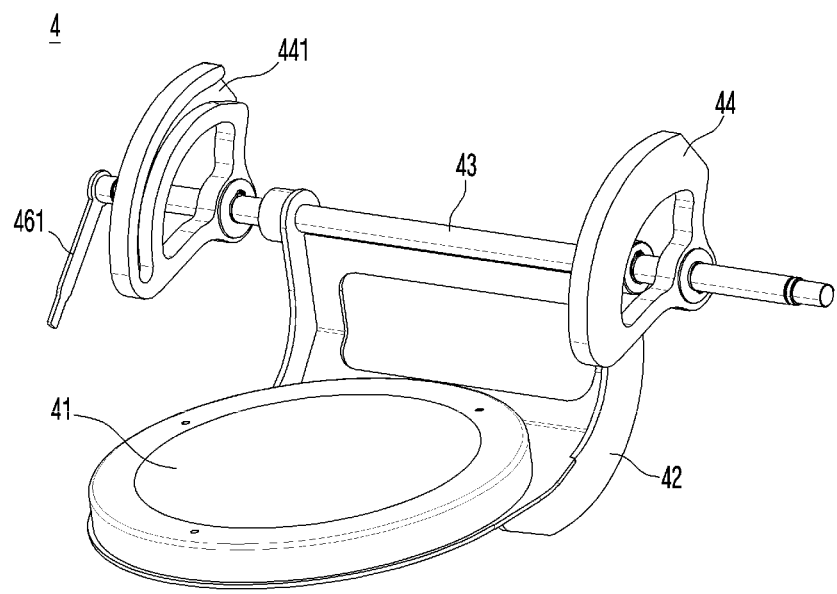
FIG. 6 is a perspective view of the induction heater of the compression type ramen cooker using induction heater according to the present invention.
Figure 7:
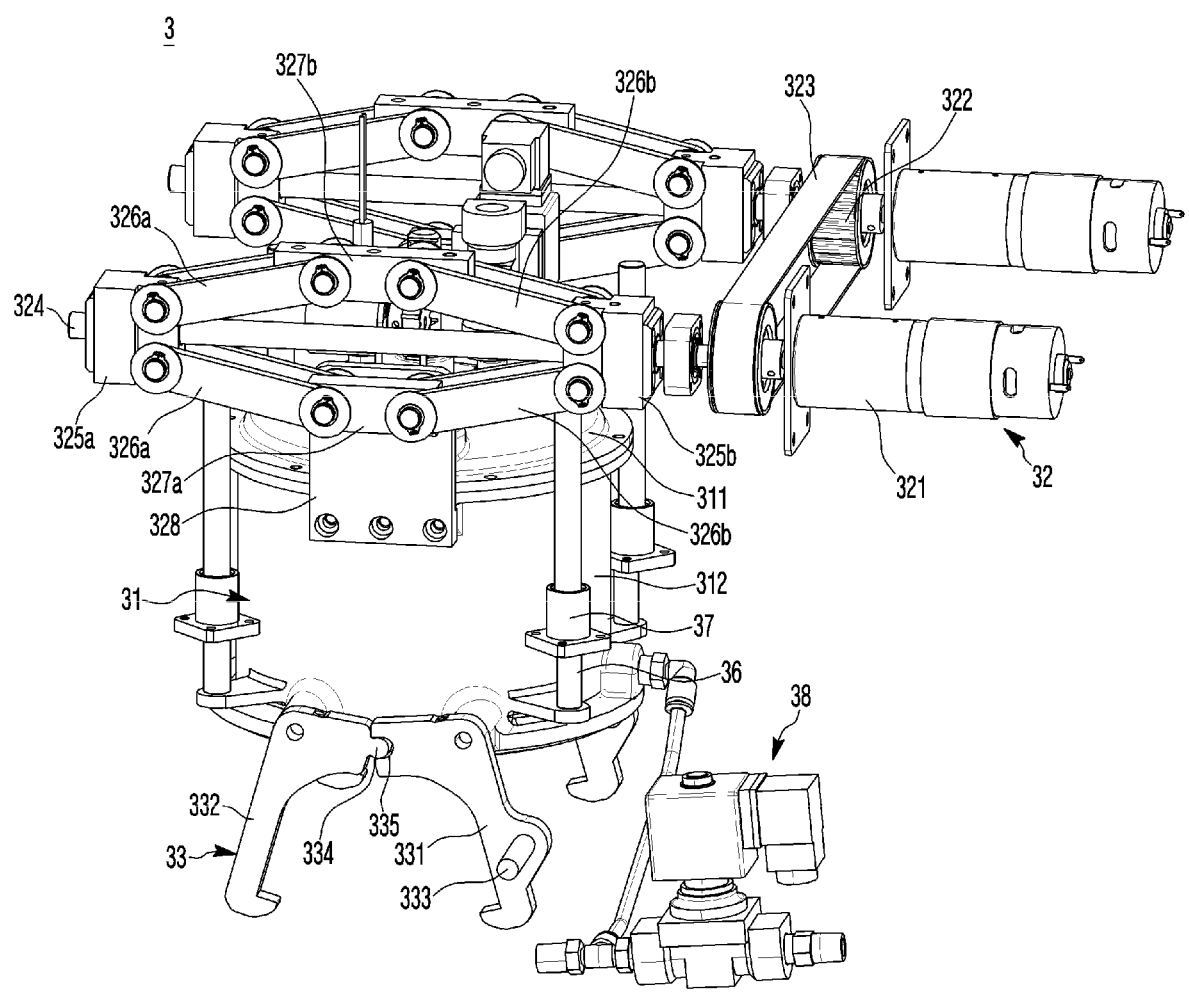
FIG. 7 is a perspective view of the compression chamber of the compression type ramen cooker using induction heater according to the present invention.
Figure 8:
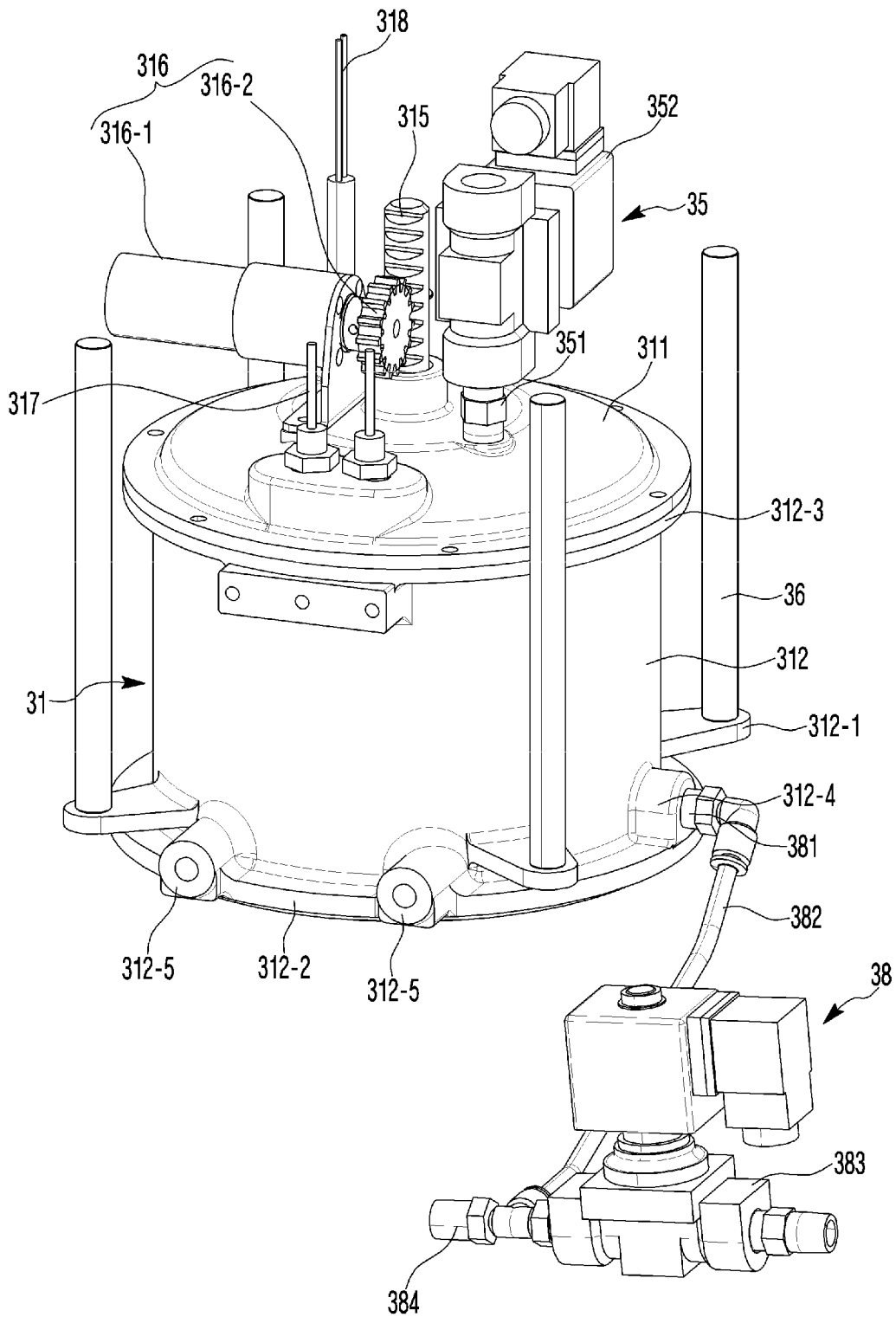
FIG. 8 is a perspective view of the compression chamber of the compression chamber of FIG. 7.
Figure 9:
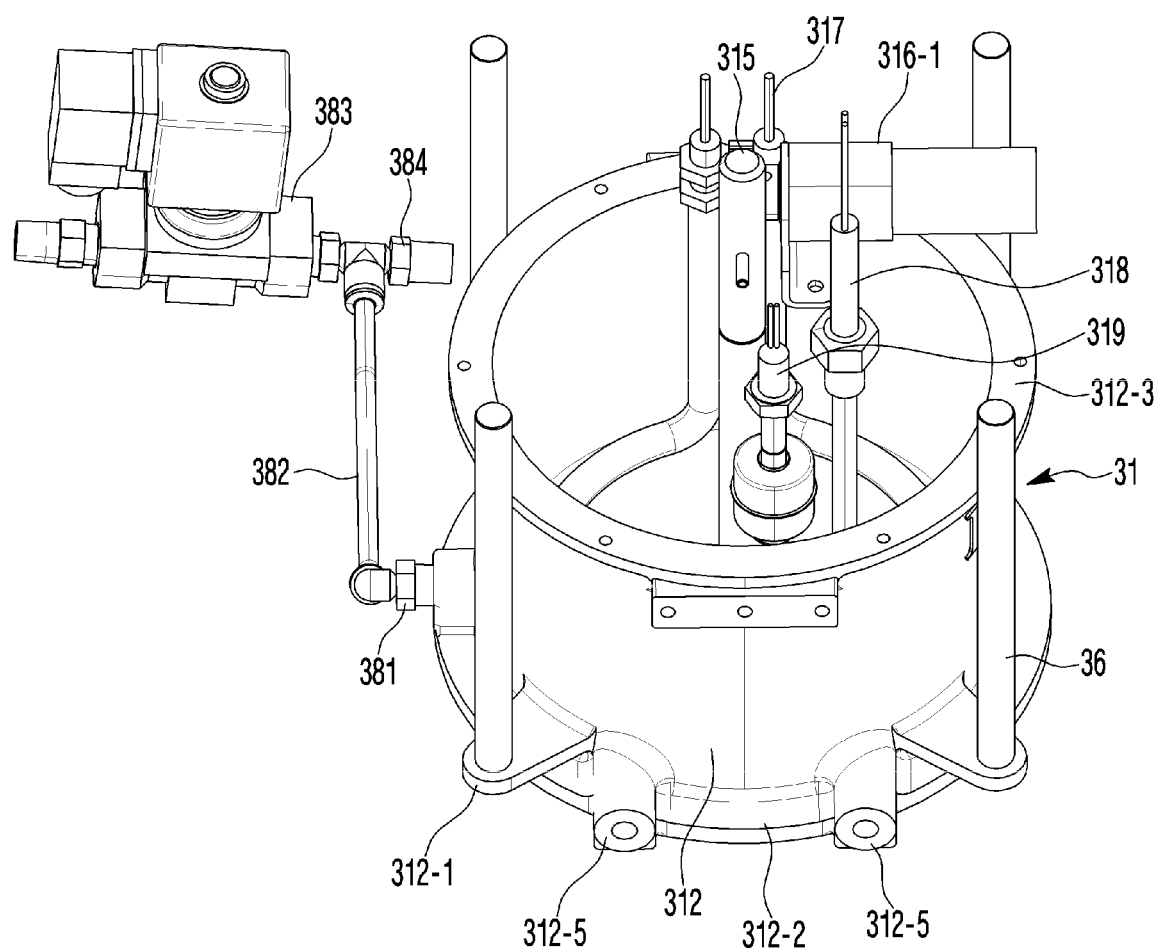
FIG. 9 is a partial perspective view of the compression chamber of the compression chamber of FIG. 7.
Figure 10:
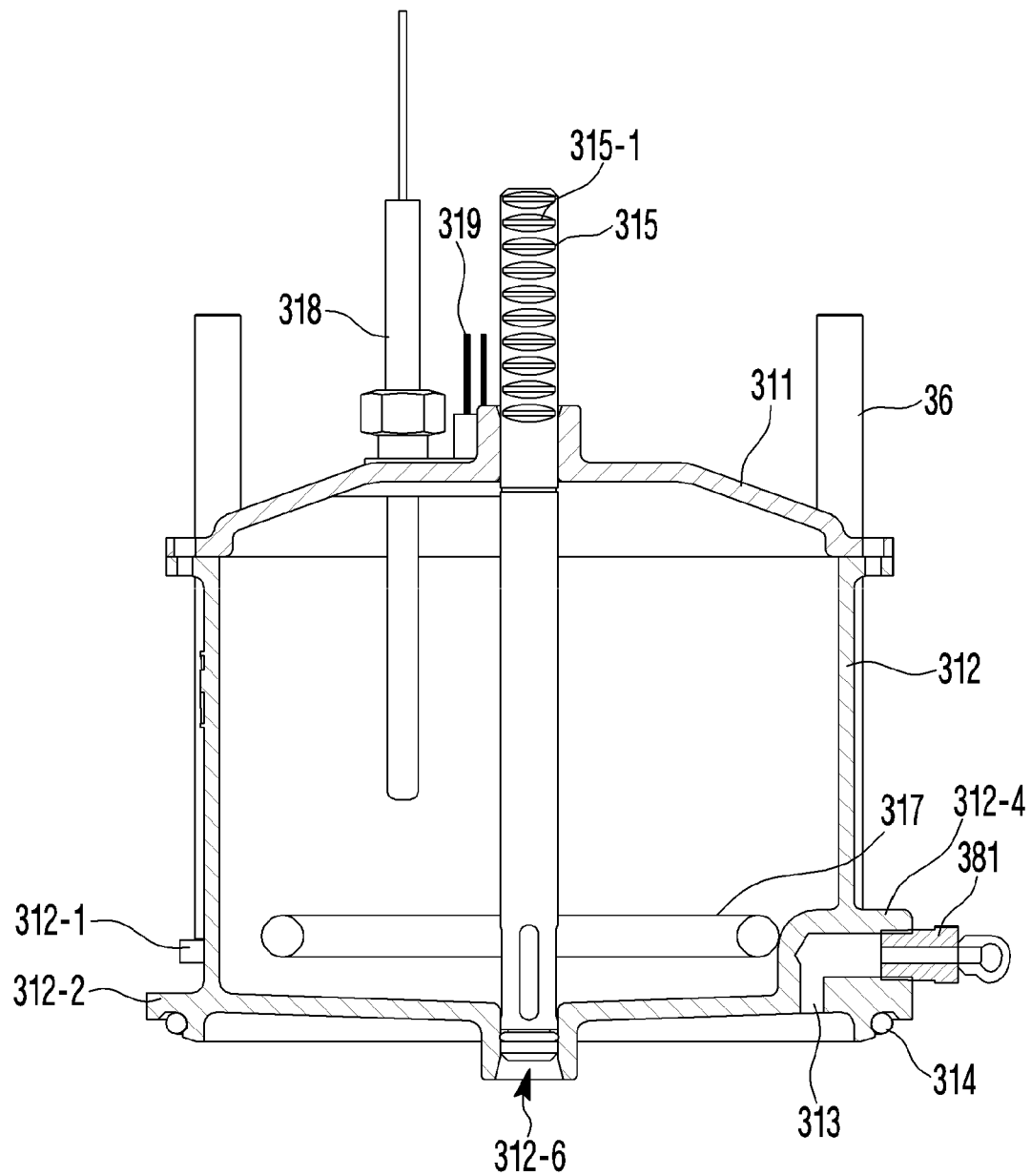
FIG. 10 is a cross-sectional view of the compression chamber of the compression chamber of FIG. 7.

FIG. 1 is a perspective view of the compression type ramen cooker using induction heater according to the present invention, and FIG. 2 is a perspective view of a state in which the side plate of one side is removed from the compression type ramen cooker using induction heater according to the present invention, and FIG. 3 is a side perspective view of the compression type ramen cooker using induction heater according to the present invention, and FIG. 4 is a perspective view of a cooking container and an induction heater of the compression type ramen cooker using induction heater according to the present invention, and FIG. 5 is a perspective view of a ramen discharging part of the compression type ramen cooker using induction heater according to the present invention, and FIG. 6 is a perspective view of the induction heater of the compression type ramen cooker using induction heater according to the present invention, and FIG. 7 is a perspective view of the compression chamber of the compression type ramen cooker using induction heater according to the present invention, and FIG. 8 is a perspective view of the compression chamber of the compression chamber of FIG. 7, and FIG. 9 is a partial perspective view of the compression chamber of the compression chamber of FIG. 7, and FIG. 10 is a cross-sectional view of the compression chamber of the compression chamber of FIG. 7, and FIG. 11A to FIG. 11C are structural diagrams illustrating the operation principle of the compression chamber and the induction heater, and FIG. 12A to FIG. 12F are structural diagrams illustrating the operating principle of washing the cooking container and discarding wash water after the ramen is cooked in the cooking container.

FIG. 1 to FIG. 3 show a compression type ramen cooker using an induction heater according to the present invention. As shown in FIG. 1, the compression type ramen cooker using an induction heater according to the present invention is composed of a main frame 1, a cooking container 2 mounted on the main frame, a compression chamber 3 to compress cooking container 21 combined with compression chamber 3, an induction heater 4 applying a heat source from the lower part of the cooking container 2, a ramen discharging part 5 discharging the ramen cooked in the cooking container 2, and a drain 6 for washing the inner side of the cooking container after ramen is cooked and discarding the washed water. The ramen cooked by this compression cooker is put into the disposable ramen container 7. Hereinafter, each configuration will be described in detail with reference to the drawings.

As shown in FIG. 1, the main frame 1 consists of a side plate 11 formed on both sides, an upper plate 12 connecting the upper portions of the side plate 11, a lower main bar 13 connecting the lower portion of the side plate 11, and an upper main bar 12 connecting the upper portion of side plate 11. The support frame 34 is fixedly mounted on the upper portion of the upper main bar 12 and the side plate 11.

As shown in FIG. 1 and FIG. 3, the cooking container 2 consists of a cooking container 21, a container fixture 22 into which the cooking container 21 is inserted and fixed, a rotating shaft 23 connected to both sides of the container fixture 22, a motor unit 25 for driving the rotating shaft 23 to be connected to one side of the rotating shaft 23, a sensor unit 26 connected to the other side of rotating shaft 23 for controlling the rotation of the rotating shaft 23, and a rotating link 24 for driving the ramen discharging part 5 forward and backward in the rotating shaft 23. The motor unit 25 is fixedly mounted on the outside of the one side of the side plate 11, and the motor unit 25 composes a driving motor 251, a driving motor shaft 252, a shaft 253 formed on the upper portion of the driving motor shaft 252, a worm gear 254 engaged with the shaft 253, and a gear groove 255 covering the shaft 253 and the worm gear 254. The worm gear 254 is equipped with a rotating shaft 23 so that the rotating shaft 23 is rotated according to the rotation of the worm gear 254, and the rotating shaft 23 is connected to the container fixture 22, and the cooking container 21 mounted on the container fixture 22 is rotated by the rotation of the driving motor 251. By the rotation of cooking container 21, the ramen cooked in the cooking container 21 may be put into the ramen container 7, and the wash water of the cooking container 21 may be discharged to the drain 6. A sensor unit 26 is provided on the outside of the other side of the side plate 11. The sensor unit 26 includes a sensing gear 261 connected to the gear 232 which is mounted on the end of the rotating shaft 23 and rotated outside of the other side of the side plate 11, a sensing bar 262 rotating together with the sensing gear 261, a cylindrical bar 264 on which a sensor 263 for detecting the rotation of the sensing bar 262 is mounted, and a sensor 263 for detecting the rotation of the sensing bar 262 which is mounted on the predetermined position of the cylindrical bar 264. Therefore, according to the rotation of the driving motor 251, the cooking container 21 rotates toward the ramen container 7 to discharge the cooked ramen, and rotates to the opposite side to discard the wash water of the cooking container 21 to the drain 6. Bearing units 231 are mounted on both sides of the rotating shaft 23, and the bearing units 231 are fixed to the side plate 11.

As shown in FIG. 1 and FIG. 7, the compression chamber 3 includes a chamber container unit 31, a vertical driving unit 32 for moving the chamber container unit 31 up and down, a fastening hook 33 coupled to the container fixture so that the chamber container unit 31 can seal and compress the cooking container 21, a support frame 34 on which the vertical driving unit 32 is mounted, a supply valve unit 35 for supplying water to the chamber container unit 31, a chamber container guide rod 36 for guiding the vertical movement of the chamber container unit 31, a chamber container guide 37 for guiding the chamber container guide rod 36 to move up and down, and a compressed air discharge unit 38 for discharging compressed air in the cooking container 21. Specifically, the chamber container unit 31 includes a lid 311 and a container body 312 to which the lid 311 is fixed and the bottom surface is coupled to the cooking container 21 to seal the cooking container 21. The vertical driving unit 32 is connected to both upper sides of the chamber container unit 31 to move the chamber container unit 31 up and down. The fastening hooks 33 are mounted on both lower sides of the chamber container unit 31 and are coupled to the container fixture 22 of the cooking container 21 according to the rotation of the induction heater 4. The support frame 34 includes a lower support plate 341 mounted on the upper main bar 12, a support bar 343 mounted on a corner of the lower support plate 341, and a upper support plate 342 mounted on the upper portion of the support bar 343. The chamber container guide 37 is fixed to the lower support plate 341, and the chamber container guide rod 36 moving up and down by the driving of the vertical driving unit 32 is able to move up and down in fixed position by the chamber container guide 37 fixedly mounted to the lower support plate 341.

The compression chamber 3 will be described in more detail with reference to FIG. 7 to FIG. 10. As shown in the figure, the chamber container unit 31 is connected to the vertical driving unit 32. The vertical driving unit 32 includes a driving motor 321, a rotating shaft 324 rotated by the driving motor 321 and threaded on the outer circumferential surface, one side thread guide 325a and the other side thread guide 325b that move forward and backward by the threads formed on the rotating shaft 324 as the rotating shaft 324 rotates, One side link 326a connected to the one side thread guide 325a and the other side link 326b connected to the other side thread guide 325b, a central link 327a to connect the one side link 326a and the other side link 326b each other, a central link fixing plate 328 to which the central link 327a is fixed, and a belt pulley 322 mounted on one side of the driving motor 321 to transmit rotational force. The links may be formed vertically. When formed vertically, the links composed of one side link 326a, the other side link 326b and the central link 327a of the lower side, and one side link 326a, the other side link 326b and the central link 327b of the upper side. The upper central link 327b is fixed to the upper support plate 342. Accordingly, as the rotating shaft 324 rotates, the chamber container unit 31 descends down. The driving motor 321 is formed in a pair, and the belt pulley 322 is also formed in a pair. When one side of the driving motor 321 is driven, the other side does not operate, and when the other side is driven, one side does not operate. Accordingly, the one side belt pulley 322 transmits the rotational force through the belt 323 to the other side belt pulley, and by the rotation of the rotational shaft 324 which the rotational force is transmitted, it is possible to move the forward and backward movement of the one side thread guide and the other side thread guide. The chamber container unit 31 includes a lid 311, a container body 312 to which the lid 311 is coupled, a compressed air discharge hole 313 formed on the lower side of the container body 312, a packing ring 314 for sealing the container when combined with the cooking container 21 to the lower side of the container body 312, a bar-type discharge valve 315 for opening or closing the water discharge hole 312-6 formed in the center of the container body 312 to supply water to the cooking container 21, a valve driving unit 316 mounted on the lid 311 to supply or block water while driving the discharge valve 315 up and down, a wire heater 317 for heating the water in the container body 312 connected to the inside of the container body 312 through the lid 311, a temperature sensor 318 for measuring the temperature of the water inside the container body 312, and a floating sensor 319 for measuring the water level in the container body 312. In addition, a supply valve 35 is connected to the lid 311 for supplying water to the container body 312 through the lid 311. In addition, a compressed air discharge unit 38 connected to the compressed air discharge hole 313 is further provided to discharge the compressed air in the cooking container 21.

The container body 312 consists of a upper flange 312-3 connected to the lid 311, a guide rod support plate 312-1 formed on the outer lower part of the container body 312 to which the guide rod is connected, a lower flange 312-2 for sealing the cooking container 21, a compressed air outlet connector 312-4 to which the compressed air outlet 38 is connected, and a fastening hook mounting hole 312-5 mounted on the fastening hook 33. A wire heater 317 is mounted in the container body 312 and heats the water in the container body 312.

The fastening hook 33 is mounted on a pair of fastening hook mounting holes 312-5 formed on the lower side of the container body 312, and one side fastening hook 331 and the other side fastening hook 332 are rotatably fixed to each the fastening hook mounting hole 312-5. A guide protrusion 333 is further formed on the one side fastening hook 331 to be mounted on the container fixture 22 while moving along the arc-shaped guide groove 441 of the rotation guide 44. The one-side fastening hook 331 and the other-side fastening hook 332 are jointed to each other at the top so that they can move opposite together, and the articular protrusion 334 and the articular protrusion groove 335 is formed. An articular protrusion groove 335 is formed in the one-side fastening hook 331, and an articular protrusion 334 is formed in the other-side fastening hook 332. The articular protrusion 334 and the articular protrusion groove 335 are made in a circular shape, and the guide protrusion 333 of the one-side fastening hook 331 moves along the arc-shaped guide groove 441 of the rotation guide 44. As the rotation shaft 43 rotates, the rotation guide 44 mounted on the rotation shaft 43 is rotated together, accordingly the guide protrusion 333 is pushed toward the container fixture 22, and when the one-side fastening hook 331 is pushed toward the container fixture 22, the articular protrusion groove 335 is also directed upward, and as a result, the articular protrusion 334 positioned in the articular protrusion groove 335 also moves upward, and the other-side fastening hook 332 is also pushed toward the container fixture 22, and accordingly the lower flange 312-2 of the container body 312 contacts closely with the upper end of the cooking container 21. A packing ring 314 is provided on the lower flange 312-2 to improve sealing.

The supply valve unit 35 includes a supply pipe 351 connected to the lid 311 and a solenoid valve 352 connected to the supply pipe 351 to supply or block water to the supply pipe 351. A supply line (not drawn) for supplying water is connected to the solenoid valve 352.

The valve driving unit 316 for driving the discharge valve 315 includes a gear 316-2 to move the discharge valve 315 up and down interlocked with a gear groove formed at the upper end of the discharge valve 315 and a motor 316-1 to which the gear 316-2 is mounted.

A compressed air discharge unit 38 includes a joint 381 connected to a compressed air discharge connector 312-4 in which a compressed air discharge hole 313 is formed, and a tube 382 connected to the joint 381, and a solenoid valve 383 connected to the tube for opening and closing the tube, and an outlet 384 through which compressed air is discharged by the solenoid valve 383. When cooking is completed in the cooking container 21, the compressed air is discharged through the compressed air discharge hole 313, and the discharged compressed air is discharged to the outside by opening the solenoid valve 383.

As shown in FIG. 2, FIG. 3, and FIG. 6, the induction heater 4 includes an induction heater 41 in contact with the underside of the cooking container 21, a support link 42 which one-side fix and support the induction heater 41 and the other-side is connected to the rotation shaft 43, a rotation shaft 43 to which the other-side of the support link 42 is fixed, a rotation guide 44 for mounting or detaching the fastening hook 33 to the container fixture 22 by guiding the forward and backward movement of the fastening hook 33 while being fixed to the rotary shaft 43 and rotating together with the rotation shaft 43, a motor 45 for rotating the rotation shaft 43, and a sensor unit 46 for controlling the rotation angle of the induction heater 41. Bearing parts 431 are mounted on both sides of the rotation shaft 43, and the bearing parts 431 are fixed to the side plate 12. In addition, the sensor unit 46 formed on the other-side of the rotation shaft 43 includes a sensing bar 461 that is mounted on the other-end of the rotation shaft 43 and rotates together with the rotation shaft 43, a sensor 462 for detecting the rotation of the sensing bar 461, and an arc-shaped bar 463 on which the sensor 462 is mounted. The sensing bar 461 rotates together with the rotation shaft 43 and the rotation angle is fixed by the sensor 462. As shown in FIG. 6, the rotation guide 44 has an arc-shaped guide groove 441 formed thereon, and the rotation guide moves the guide protrusion 333 of the one-side fastening hook 331 forward and backward through the arc-shaped guide groove 441 which the inlet is open and the end is closed. That is, the guide protrusion 333 of the one-side fastening hook 331 enters the inlet side, and as it progresses toward the end-side of the guide groove 441, the guide protrusion 333 moves toward the container fixture 22.

As shown in FIG. 1 to FIG. 3 and FIG. 5, the ramen discharging part 5 includes a discharge frame 51, a container discharge unit 52 mounted on the upper portion of the discharge frame, a discharge guide 53 mounted on the underside of the discharge frame 51, and a guide bar 54 for guiding the forward and backward movement of the discharge guide 53. The discharge frame 51 is composed of a base plate 511 and a side base plate 512 extending upward from both sides of the base plate 511, and a guide plate 513 to which a guide groove 514 is further attached to the side base plate 512. The container discharge unit 52 is provided on the upper portion of the base plate 511, and the discharge guide 53 for the front and rear movement of the discharge frame 51 is mounted on the underside of the base plate 511, and the guide bar 54 is mounted on the lower main bar 13 so that the discharge frame 51 may move forward and backward. The discharge frame 51 can move forward and backward as the rotation link 24 moves up and down along the guide groove 514 formed in a predetermined track on the guide plate 513.

A drain 6 is mounted on the lower main bar 13, and after being cooked in the cooking container 21, the washing water for washing the cooking container 21 is discharged.

As shown in FIG. 1 and FIG. 5, the container discharge unit 52 includes a ramen container support plate 521, a ramen container holder 522 attached to the ramen container support plate 521, a pair of guide bars 528 mounted on the underside of the ramen container support plate 521, a guide bar fixing member 523 for fixing the guide bar 528 to the underside of the ramen container support plate 521, a drive motor 524 for moving the guide bar 528 forward and backward, a gear shaft 525 receiving the rotational force of the drive motor 524, a pair of driving gears 526 mounted on both ends of the gear shaft 525 for moving the guide bar 528 forward and backward to be engaged with grooves formed in the guide bar 528, a gear shaft support part 527 fixedly mounted on the base plate 511 while supporting the driving gear 526, and a water droplet entry prevention plate 529 for preventing water droplets from entering the inside when discarding the washing water of the cooking container 21. The front of the guide bar 528 is fixed to the guide bar fixing member 523 and moves forward and backward along the container discharge guide 55. The container discharge guide 55 is fixed to the base plate 511.

Figure 11A:
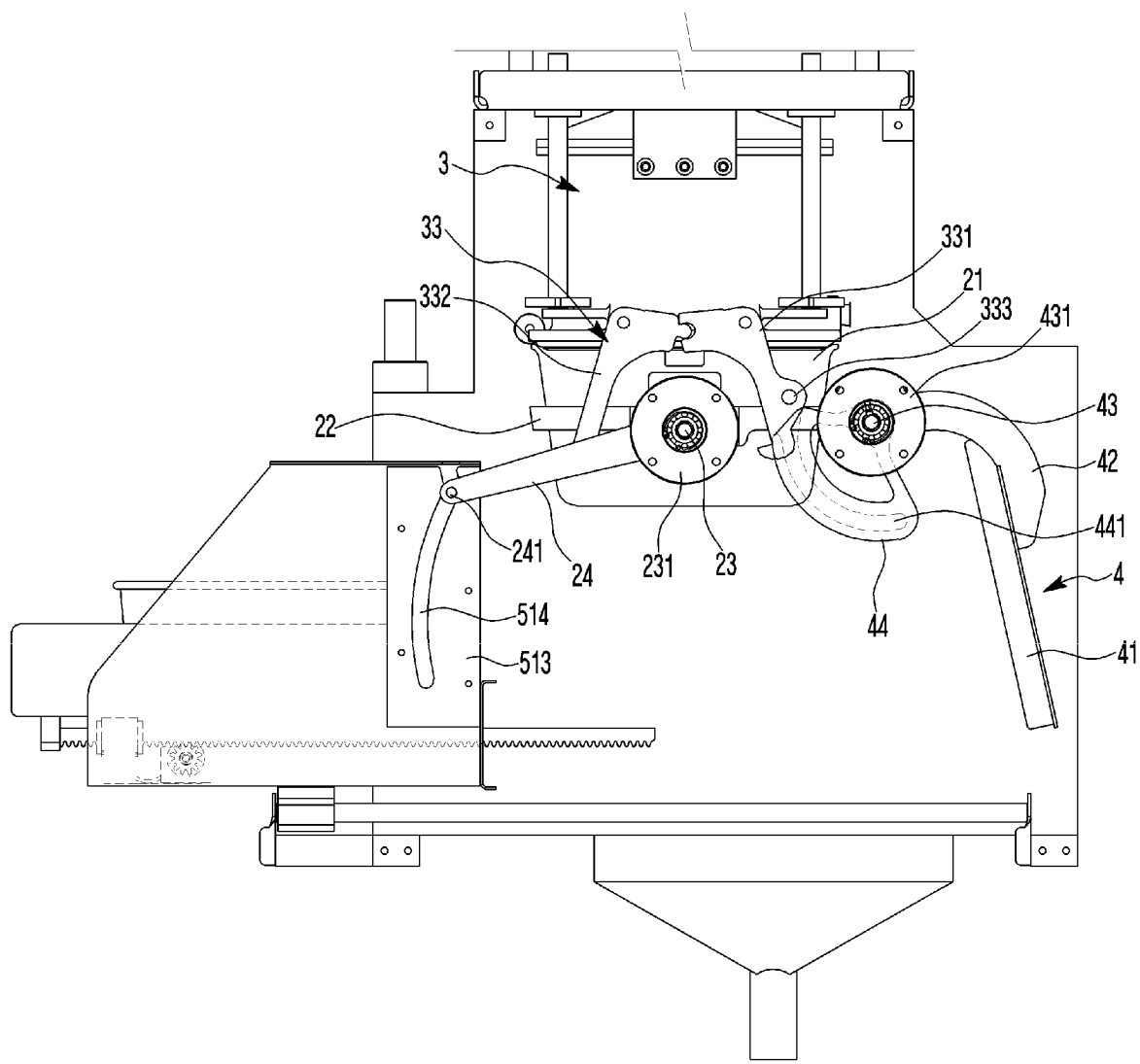
FIG. 11A to FIG. 11C are structural diagrams illustrating the operation principle of the compression chamber and the induction heater.
Figure 11B:
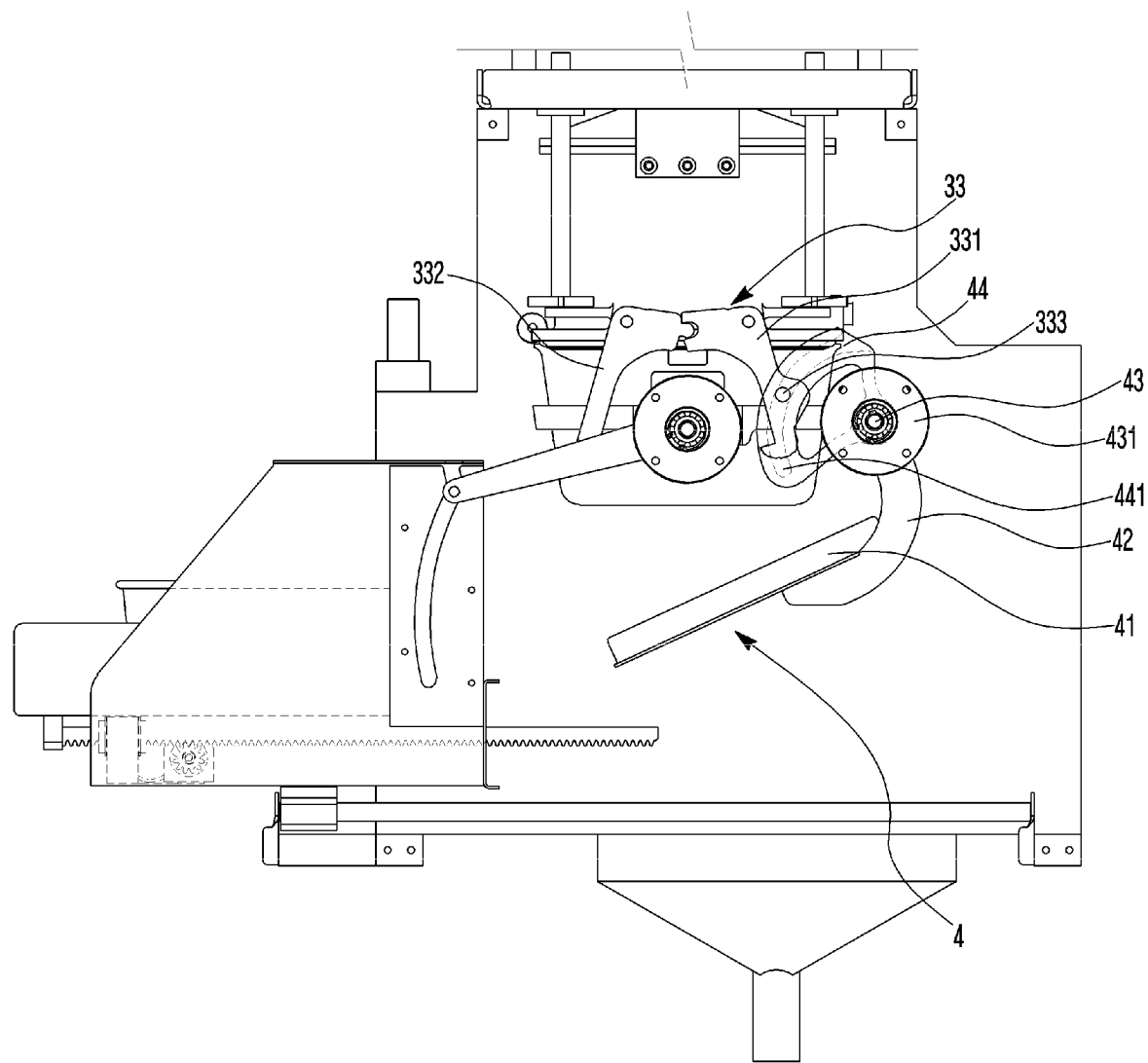
Figure 11C:
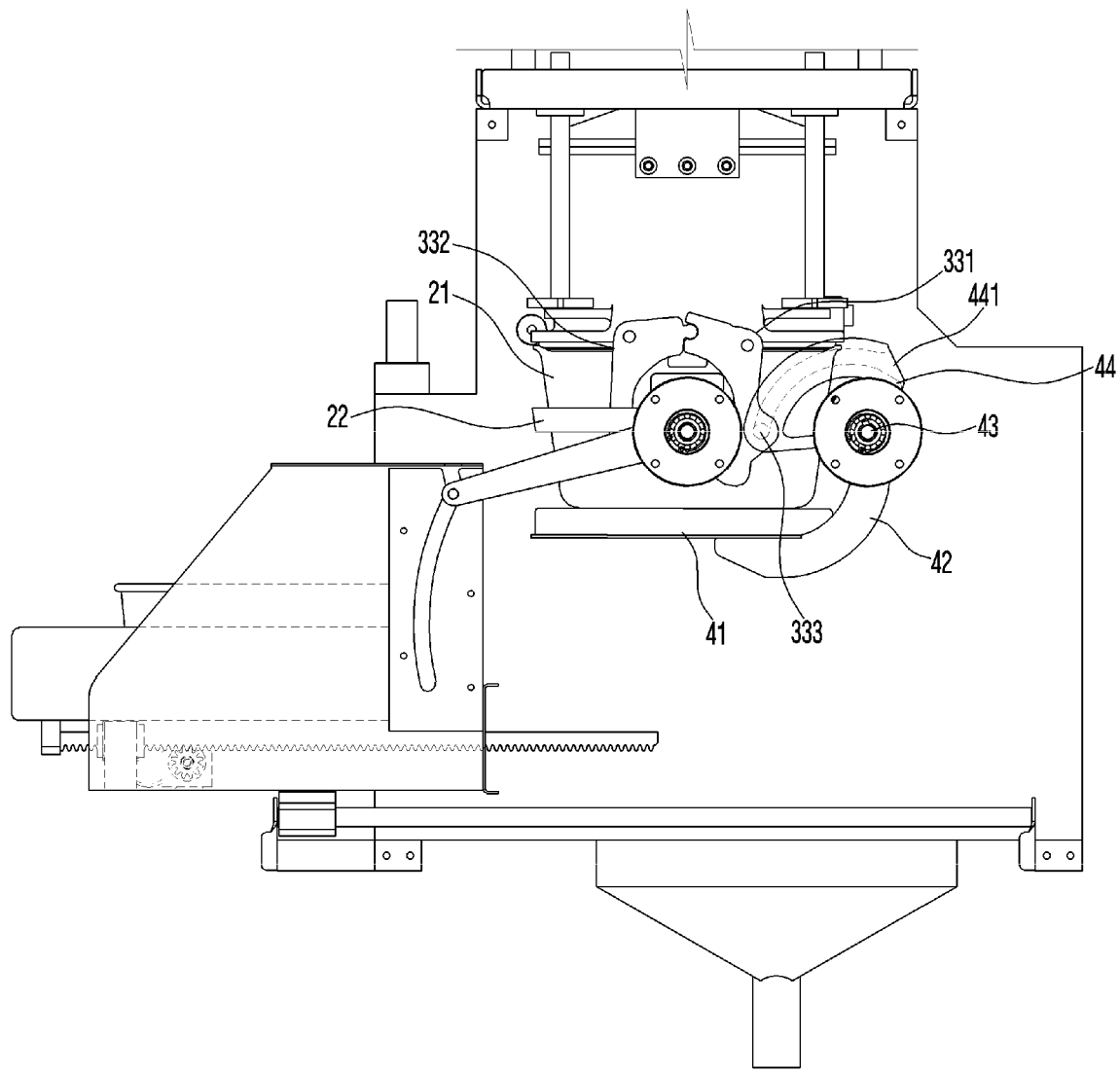

FIG. 11A to FIG. 11C show that the compression chamber 3, the cooking container 2, and the induction heater 4 are coupled and fixed to each other. As shown in FIG. 11A, the compression chamber 3 comes down by the vertical drive unit 32, and the chamber container unit 31 of the compression chamber 3 comes down to the lower part until it comes into close contact with the cooking container 21. When the chamber container unit 31 is in close contact with the cooking container 21, the driving motor 451 of the induction heater 4 is operated, and as the driving motor 451 is operating, the rotation shaft 43 rotates, and as the rotation shaft 43 rotates, the rotation guide 44 rotates together. As the rotation guide 44 rotates, the guide protrusion 333 of the one-side fastening hook 331 moves along the arc-shaped guide groove 441 of the rotating guide 44 toward the cooking container 21. As a result, the other-side fastening hook 332 also moves toward the cooking container 21 and the hook is fixed to the container fixture 22. In addition, as the rotation shaft 43 rotates, the induction heater 41 also rotates, and the induction heater 41 is rotated so as to be in contact with the underside of the cooking container by the sensor unit 46 controlling the rotation angle of the induction heater, and then the position of the induction heater 41 is fixed. Then, power is applied to the induction heater 41 to start cooking the ramen put into the cooking container 21.

After the ramen is cooked for a certain period of time, when the ramen is cooked, the compressed air in the cooking container 21 is discharged to the outside through the compressed air discharge unit 38. When the discharge of the compressed air is completed, the compression chamber 3 moves upward by the vertical drive unit 32.

Figure 12A:
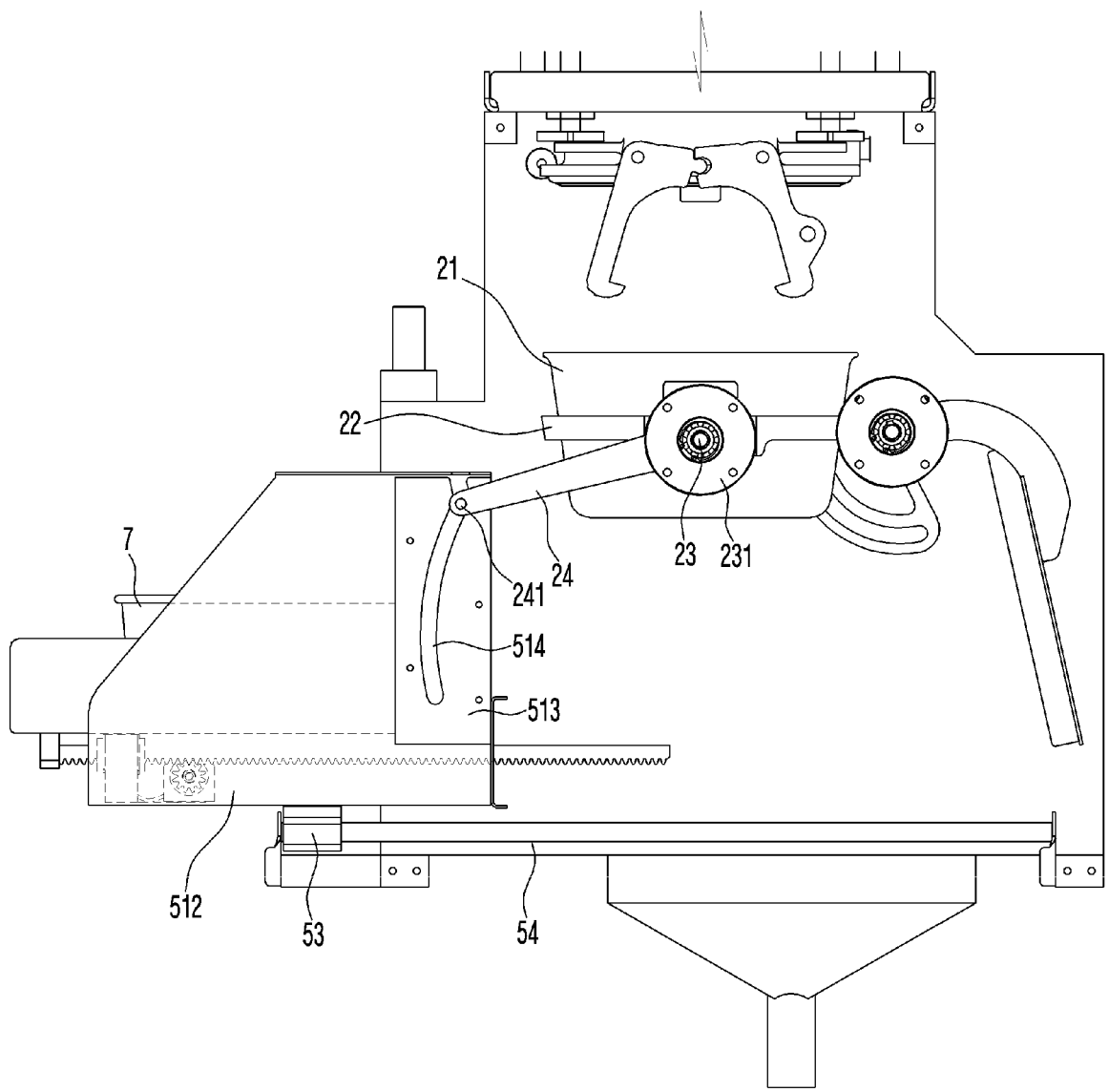
FIG. 12A to FIG. 12F are structural diagrams illustrating the operating principle of washing the cooking container and discarding wash water after the ramen is cooked in the cooking container.
Figure 12B:
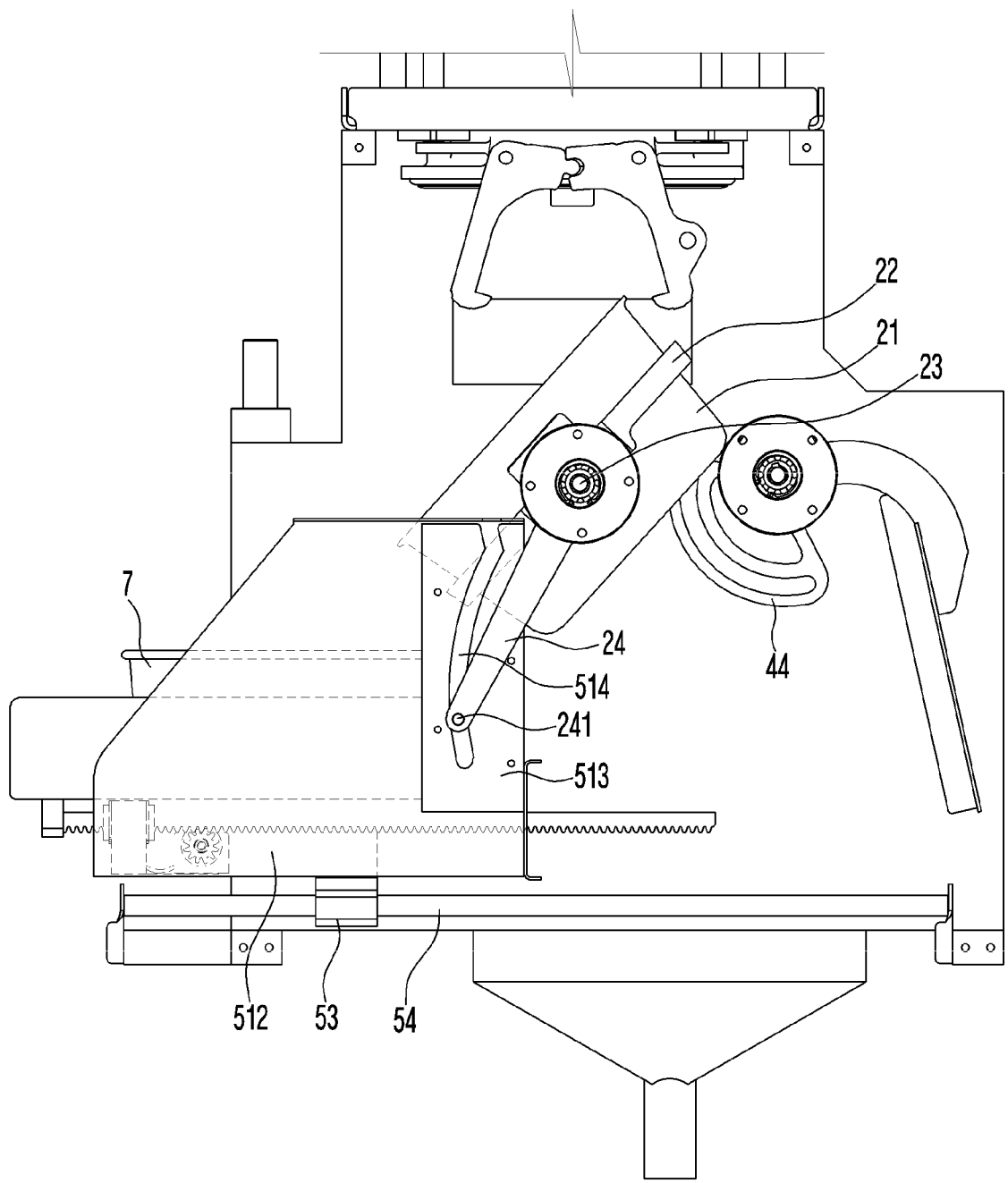
Figure 12C:
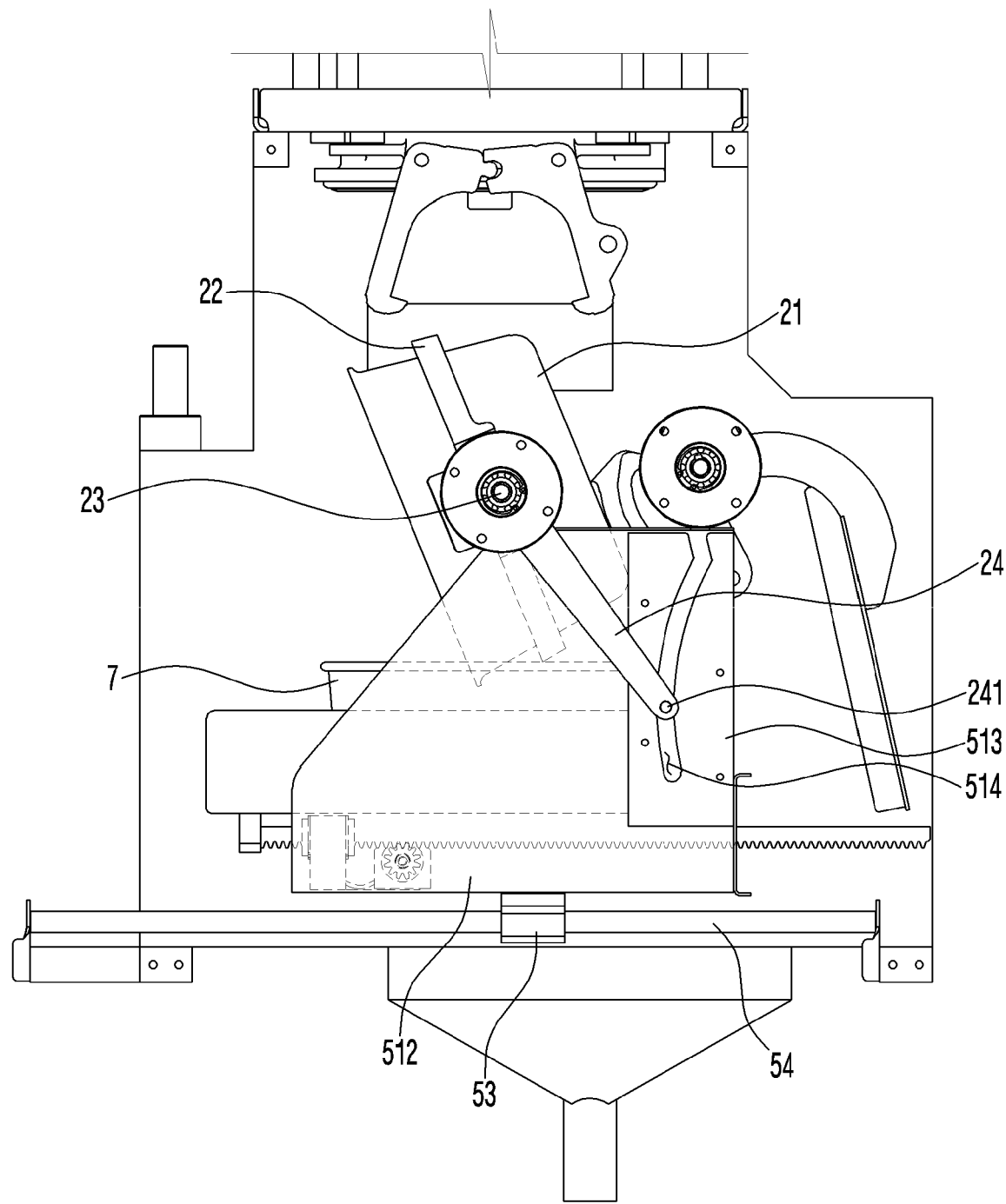
Figure 12D:
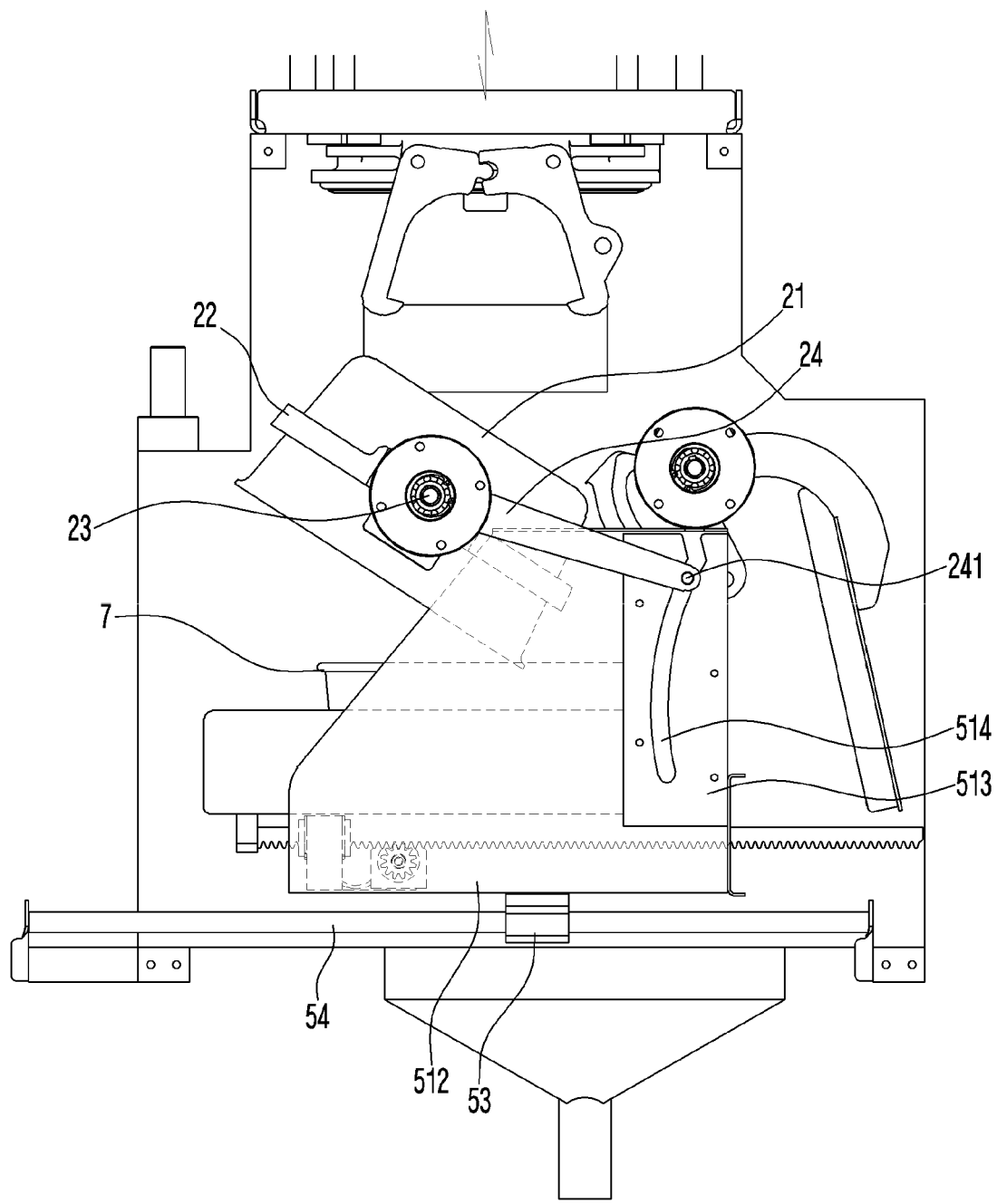
Figure 12E:
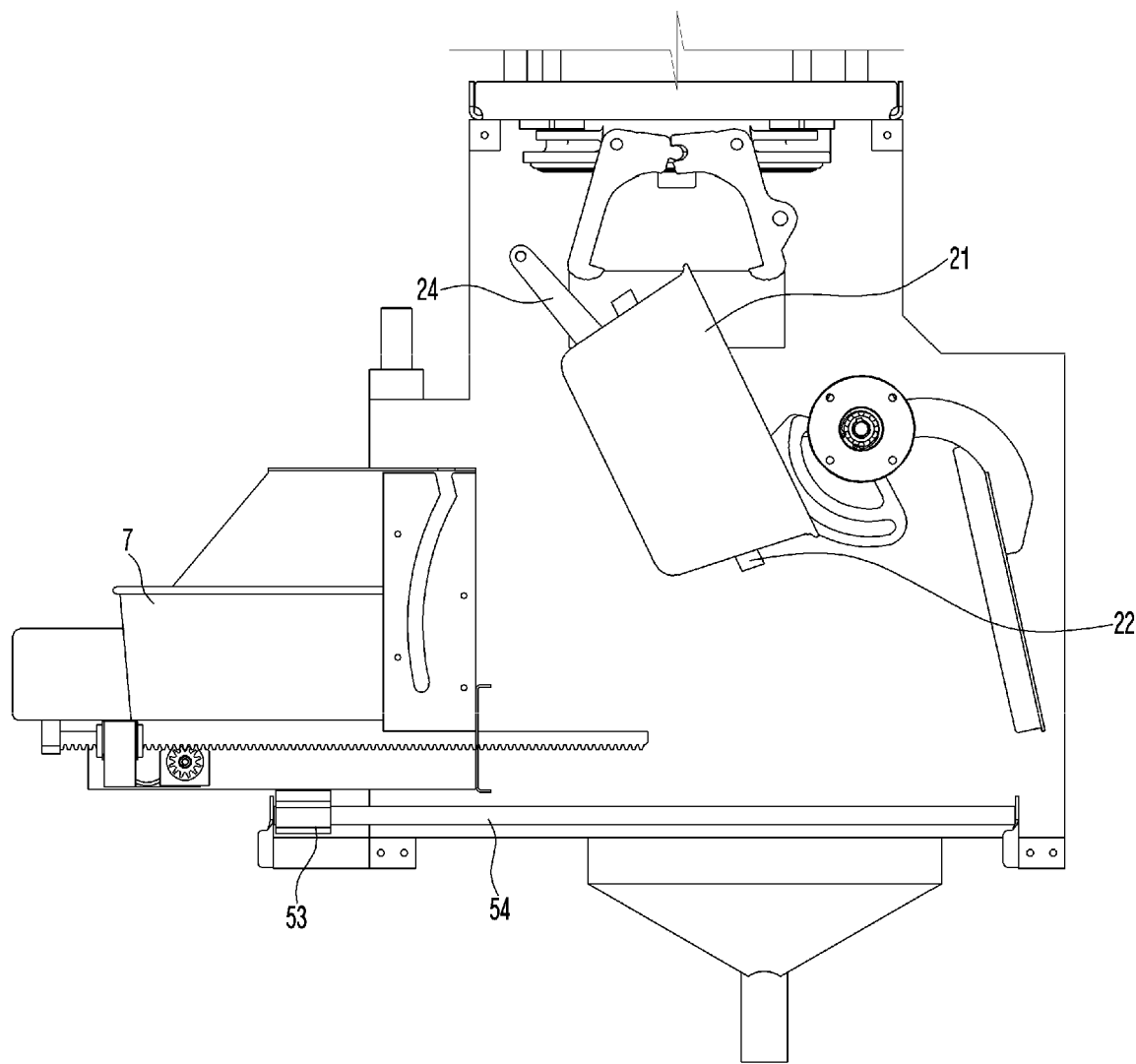
Figure 12F:
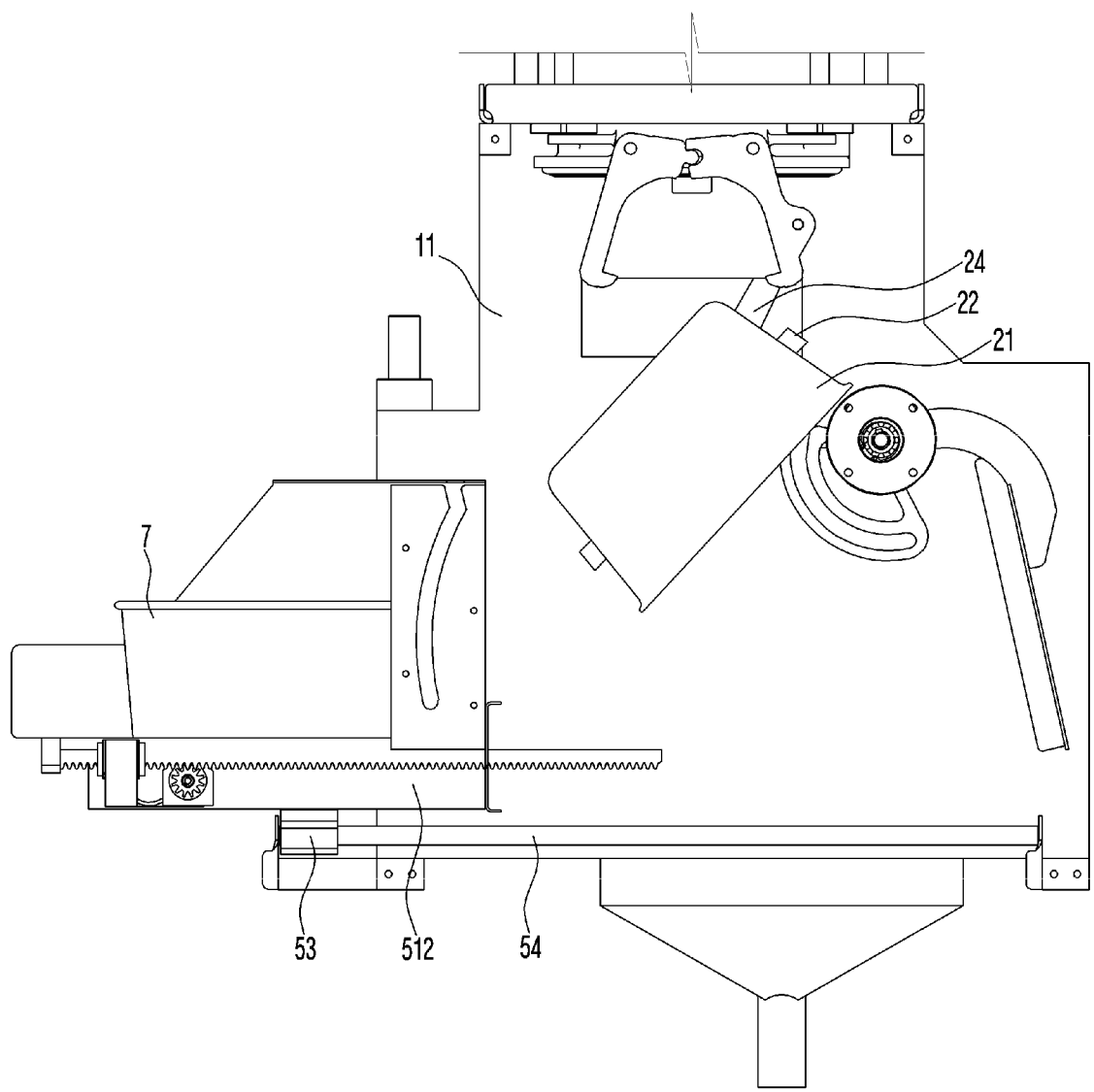

FIG. 12A to FIG. 12F show a process of putting cooked ramen into the ramen container 7 and removing the residue in the cooking container 21. Each process will be described in detail with reference to the drawings. FIG. 12A shows a state in which compressed air is removed after cooking is completed and the compression chamber 3 is moved upward. In addition, after the cooking is completed, the induction heater 4 is also rotated and returned to its original position. At this time, as shown in the drawing, the link guide protrusion 241 of the rotation link 24 is positioned while being inserted into the guide groove 514. As shown in FIG. 12B, the rotation shaft 23 connected to the container fixture 22 of the cooking container 21 is rotated by the driving of the driving motor 251 of the motor unit 25, and as the rotation shaft rotates, the cooking container 21 and the rotation link 24 rotates accordingly, and the link guide protrusion 241 rotates in a circular arc with a certain radius by the rotation of the rotation link 24, and the link guide protrusion 241 rotates along the guide groove 514, and accordingly, the ramen discharging part 5 moves to the inside of the main frame 1, and at the same time, the cooking container 21 also rotates. FIG. 12C shows that the cooking container 2 is moved further inside the main frame 1 due to the rotation link 24 being further rotated, and FIG. 12D shows that the rotation link is rotated as much as possible while being completely turned over and the cooked ramen is put into the ramen container 7 together with the ramen broth. FIG. 12E shows that as the rotation shaft 23 rotates in the opposite direction, the rotation link 24 also rotates in the opposite direction again, and after the link guide protrusion 241 is separated from the guide groove 514, it is rotated in the opposite direction. FIG. 12F shows that washings or debris in the cooking container 21 are removed while being turned over almost in the opposite direction.

As described above, the compression type ramen cooker using the induction heater according to the present invention has an advantage that the cooking time is shortened because the water is heated in the compression chamber 3 and the heated water is put into the cooking container 21. In addition, since the induction heater 41 is used, there is an advantage in that the risk of fire due to overheating can be prevented. In addition, after the ramen is cooked, it is automatically discharged to the ramen container 7, and the user only needs to take the ramen container 7, and since the cooking container 21 can be washed with the heated water of the chamber container unit 31 of the compression chamber 3, it has the advantage of being able to block microorganisms such as germs or bacteria etc.

As described above, the present disclosure can be made in various modifications, and preferred embodiments of the present disclosure have been described, but the present disclosure is not limited to these embodiments. In the claims and the detailed description of the present disclosure, it will be appreciated that the techniques that can be modified and used by those skilled in the art are included in the scope of the present disclosure.

The present invention relates to a compression-type ramen cooker using an induction heater, and by heating the induction heater in a compressed state using a compression-type cooking container, the ramen can be cooked quickly, so that it can be quickly enjoyed indoors or outdoors.

What is claimed is:

1. A compression type ramen cooker comprising:
   a main frame comprising side plates formed on both sides, an upper main bar connecting the upper portions of the side plates, and a lower main bar connecting the lower portions of the side plates;
   a cooking container assembly rotatably mounted on the inner side of the side plate;
   a compression chamber mounted on the upper part of the upper main bar to close or open the cooking container while moving up and down;
   an induction heater assembly rotatably mounted on the rear side of the cooking container to heat the cooking container;
   a ramen discharging part for discharging the cooked ramen from the cooking container; and
   a drain installed at the lower end of the side plates on both sides to discard the water washed away from the cooking container after cooking.

2. The compression type ramen cooker of claim 1, wherein the cooking container assembly comprises:

a cooking container into which ramen and soup are put; a container fixture to which the cooking container is inserted and fixed;

a rotating shaft that is fixedly mounted on both sides of the container fixture;

a rotating link mounted on the rotating shaft to move the ramen discharging part forward and backward while rotating together;

a motor unit for rotating the rotating shaft from one side of the rotating shaft; and a sensor unit for controlling the rotation angle of the motor unit at the other side of the rotation shaft.

3. The compression type ramen cooker of claim 2, wherein the compression chamber comprises:

a support frame comprising a lower support plate mounted on the upper main bar, a support bar mounted on a corner of the lower support plate, and an upper support plate mounted on the upper portion of the support bar;

a chamber container unit comprising a lid and a container body to which the lid is fixed and the bottom surface is coupled to the cooking container to seal the cooking container;

a vertical driving unit connected to both upper sides of the chamber container unit and mounted on the upper support plate to move the chamber container unit up and down; and fastening hooks mounted on both lower sides of the chamber container unit and coupled to the container fixture of the cooking container according to the rotation of the induction heater.

4. The compression type ramen cooker of claim 3, wherein the induction heater assembly comprises:

an induction heater in contact with the lower portion of the cooking container;

a support link fixedly supporting the induction heater at one side and connected to the rotating shaft at the other side;

a rotating shaft to which the other side of the support link is fixed;

a rotation guide fixed to the rotating shaft and rotating together with the rotating shaft to guide the forward and backward movement of the fastening hook and to mount or detach the fastening hook to the container fixture;

a motor unit for rotating the rotating shaft; and a sensor unit for controlling the rotation angle of the motor unit.

5. The compression type ramen cooker of claim 4, wherein the ramen discharging part comprises:

a discharge frame comprising a base plate, and a side base plate extending upward from both sides of the base plate and having a guide plate with a guide groove formed on an outer surface;

a container discharge unit mounted on an upper portion of the base plate;

a discharge guide mounted on the underside of the base plate; and a guide bar mounted on the main bar to guide the forward and backward movement of the discharge guide;

wherein the ramen discharging part moves forward and backward as the link pin of the rotating link moves up and down in a predetermined track of the guide groove.

* * * * *